United States Patent
Wang et al.

(10) Patent No.: US 6,620,225 B2
(45) Date of Patent: Sep. 16, 2003

(54) ADSORBENTS FOR LOW VAPOR PRESSURE FLUID STORAGE AND DELIVERY

(75) Inventors: Luping Wang, Brookfield, CT (US); Doug Neugold, Southbury, CT (US)

(73) Assignee: Advanced Technology Materials, Inc., Danbury, CT (US)

(*) Notice: Subject to any disclaimer, the term of this patent is extended or adjusted under 35 U.S.C. 154(b) by 0 days.

(21) Appl. No.: 10/043,731

(22) Filed: Jan. 10, 2002

(65) Prior Publication Data

US 2003/0126991 A1 Jul. 10, 2003

(51) Int. Cl.[7] .............................................. B01D 53/04
(52) U.S. Cl. ............................... 96/108; 96/153; 502/526
(58) Field of Search ....................... 96/108, 146, 153, 96/154; 95/114, 115, 131, 132; 206/0.6, 0.7; 502/400, 526; 222/3; 62/46.1, 48.1

(56) References Cited

U.S. PATENT DOCUMENTS

| | | | | |
|---|---|---|---|---|
| 4,483,461 A | * | 11/1984 | Igarashi .......................... 222/3 |
| 5,460,745 A | * | 10/1995 | Lee ........................ 252/182.32 |
| 5,518,528 A | | 5/1996 | Tom et al. ..................... 95/103 |
| 5,704,965 A | * | 1/1998 | Tom et al. ...................... 95/95 |
| 5,707,424 A | * | 1/1998 | Tom et al. ...................... 95/95 |
| 5,895,519 A | * | 4/1999 | Lorimer ......................... 95/56 |
| 5,917,140 A | * | 6/1999 | Tom ............................. 96/143 |
| 6,066,592 A | * | 5/2000 | Kawae et al. ................. 502/439 |
| 6,083,298 A | * | 7/2000 | Wang et al. .................... 95/99 |
| 6,089,027 A | * | 7/2000 | Wang et al. .................. 62/46.1 |
| 6,406,519 B1 | * | 6/2002 | Tom et al. ...................... 95/95 |
| 6,453,924 B1 | * | 9/2002 | Wang et al. .................... 137/1 |
| 6,474,076 B2 | * | 11/2002 | Wang et al. ................. 62/48.1 |

* cited by examiner

*Primary Examiner*—Duane Smith
*Assistant Examiner*—Frank M. Lawrence
(74) *Attorney, Agent, or Firm*—Margaret Chappuis; Steven J. Hultquist; William F. Ryann

(57) ABSTRACT

The invention relates to a fluid storage and delivery system utilizing a porous metal matrix that comprises at least one Group VIII metal or Group IB metal therein. In one aspect of the invention, such porous metal matrix forms a solid-phase metal adsorbent medium, characterized by an average pore diameter of from about 0.5 nm to about 2.0 nm and a porosity of from about 10% to about 30%. Such solid-phase metal adsorbent medium is particularly useful for sorptively storing and desoprotively dispensing a low vapor pressure fluid, e.g., $ClF_3$, $HF$, $GeF_4$, $Br_2$, etc. In another aspect of the invention, such porous metal matrix forms a solid-phase metal sorbent, characterized by an average pore diameter of from about 0.25 μm to about 500 μm and a porosity of from about 15% to about 95%, which can effectively immobilize low vapor pressure liquefied gas.

44 Claims, 2 Drawing Sheets

ADSORBENTS FOR LOW VAPOR PRESSURE FLUID STORAGE AND DELIVERY

BACKGROUND OF INVENTION

1. Field of Invention

The invention relates to a fluid supply systems, to a solid-phase adsorbent material useful for storing and dispensing fluids of low vapor pressure, and to a solid-phase sorbent material useful for storing and dispensing liquefied fluids.

2. Description of the Related Art

In a wide variety of industrial processes and applications, there is a need for a reliable source of process fluids. Such process and application areas include, but are not limited to, semiconductor manufacturing, ion implantation, manufacture of flat panel displays, medical intervention and therapy, water treatment, emergency breathing equipment, welding operations, space-based delivery of liquids and gases, etc.

Conventionally, processing fluids are supplied for commercial applications by means of high-pressure cylinders containing compressed processing fluids. However, such conventional high-pressure gas cylinders are susceptible to leakage from damaged or malfunctioning regulator assemblies, as well as to rupture if internal decomposition of the gas leads to rapid increase of interior gas pressure in the cylinder. These deficiencies pose a risk of unwanted bulk release of gas from the cylinder. Such bulk release in turn can create very hazardous and even catastrophic conditions where toxic or otherwise hazardous fluids are involved, particularly during transportation and shipment of fluid cylinders when back-up scrubbing or other safety systems may not be present.

To overcome these inherent problems of high-pressure gas cylinders, sorbent-based fluid storage and dispensing systems may be employed, of the type disclosed in U.S. Pat. No. 5,518,528, issued May 21, 1996 in the names of Glenn M. Tom and James V. McManus. Such sorbent-based fluid storage and dispensing systems effectively reduce the interior gas pressure by reversibly adsorbing sorbate fluid onto a physical sorbent medium disposed inside a containment vessel.

Sorbent-based fluid storage and dispensing systems of such type significantly reduce the risk of gas leakage and cylinder rupture associated with conventional high-pressure gas cylinders. These systems typically utilize physical sorbent materials, such as silica, carbon molecular sieves, alumina, polymers, kieselguhr, carbon, and aluminosilicates, having average pore sizes in a range of from 4 Angstroms to 13 Angstroms. Although these sorbent materials of such pore size character are effective for reducing pressure of certain high vapor pressure fluids (e.g., $AsH_3$, $PH_3$, and $BF_3$), they are not satisfactory for purpose of storing and delivering fluids of low vapor pressures (i.e. <200 psig at room temperature), especially the reactive fluids, for the following reasons.

First, such sorbent materials are chemically incompatible with low vapor pressure gases such as $ClF_3$, $WF_6$ and $Br_2$, reacting with the gases to form unwanted byproducts.

Further, such conventionally employed sorbent materials, due to their respective pore size distributions, are oftentimes characterized by adsorption potentials that are too high. They cannot effectively desorb low vapor pressure gases from the sorbent, and therefore are inadequate to deliver low vapor pressure gases to the tool under normal application conditions. The term "normal application conditions" is hereby defined as fluid delivery conditions characterized by a decrease of pressure from 650 torr to 10 torr at room temperature.

For example, sorbent materials of the type disclosed by the Tom et al. patent, which are characterized by (1) average pore sizes in the range of 4–13 Angstroms and (2) porosity in the range of 30–40%, measured as [gross volume of sorbate/gross volume of sorbent material including voids]× 100%, are only able to desorb 10–20% of the low vapor pressure gases such as $Br_2$ under normal application conditions, while the same sorbent materials can desorb 70–90% of the high vapor pressure gases such as arsine ($AsH_3$) and phosphine ($PH_3$). U.S. Pat. No. 6,089,027, issued Jul. 18, 2000 in the names of Luping Wang and Glenn M. Tom, describes an improved gas storage and dispensing system for storage and dispensing of low vapor pressure liquefied gases such as $ClF_3$, $WF_6$, $GeF_4$, and $Br_2$, etc., in which a fluid pressure regulator is disposed inside of the fluid storage and dispensing vessel. The fluid pressure regulator functions as a flow control device, which can be set at a predetermined pressure level, to dispense fluids from the vessel at such pressure level. Such "regulator in a bottle" arrangement provides an effective system for storage and dispensing of liquids and gases at pressure levels that vary from about 50 psig to about 5000 psig, depending on the specific end use application. When the pressure is set at a subatmospheric level, it can effectively eliminate the hazards of gas leaking out of the vessel in case of development of an external leak during cylinder transportation. The "regulator in a bottle" arrangement is also ideal for safe storage and delivery of very low vapor pressure (less than 14.7 psia) pyrophoric organometalllic fluids such as trimethyl aluminum, dimethyl aluminum hydride, etc. When storing pyrophoric fluids of very low vapor pressure, the "regulator in a bottle" arrangement with the subatmospherical setting can effectively prevent air from leaking into the cylinder if an external leak develops during cylinder transportation and handling, therefore eliminating the potential fire and other hazards caused by reaction between the pyrophoric fluids and the air.

However, when the fluid storage and dispensing vessel of Wang et al. patent is used for liquefied gases, the fluid pressure regulator is susceptible to malfunction, because liquefied gases can easily enter the regulator and cause discharge pressure instability. In applications such as semiconductor manufacture, the maintenance of precisely controlled flow characteristics (temperature, pressure, flow rate and composition) is critical to the achievement of satisfactory product microelectronic device structures. In such applications, the pressure instability incident to liquid ingress to the regulator compartment causes the occurrence of process perturbations that may render the product microelectronic device structure unsatisfactory or even wholly useless for its intended purpose.

Moreover, during the fluid delivery process significant cooling occurs when the liquefied gas is evaporated from the storage cylinder, due to the heat loss of vaporization. The cooling will significantly reduce the vapor pressure of the liquefied gas, resulting in insufficient evaporation and slowing down gas flow from the cylinder. One or more heat-exchange units are usually provided on the external wall of the cylinder, for externally supplying thermal energy to the liquefied gas to compensate for the heat loss caused by evaporation. However, the conventional sorbent materials have low thermal conductivities and are therefore ineffective for transfering heat to the liquefied gas inside the cylinder.

Insufficient heat transfer causes uneven distribution of thermal energy in different portions of the cylinder, i.e., overheating of the exterior of the cylinder and underheating of the interior of the cylinder.

The art has not found a solution to the above-described problems associated with low vapor pressure fluids or liquefied gases, with respect to sorbent materials having good sorptive affinity, good capacity loading characteristics, good chemical stability, good desorption characteristics, good thermal conductivity, or of liquid containment and occlusion from the regulator element in internal regulator-based fluid storage and dispensing systems.

There is accordingly a need in the art for a physical sorbent material that is chemically compatible with low vapor pressure fluids, that has an adequate pore size, porosity and pore size distribution to reduce storage pressure of low vapor pressure gases via reversible adsorption of such gases, and that enables the sorbate fluid to be readily desorbed from the physical adsorbent material for discharge from the vessel during dispensing operation.

There is concurrently a need in the art for a solution for the liquid ingress problems associated with the use of internal regulator-based fluid storage and dispensing systems.

SUMMARY OF THE INVENTION

The present invention resolves the aforementioned problems by the use of a solid-phase sorbent medium for storing and dispensing a low vapor pressure fluid, in which such solid-phase sorbent medium can effectively desorb the low vapor pressure fluid therefrom under normal application conditions. Further, the present invention is useful for storing and dispensing a liquefied gas, in which such solid-phase sorbent medium functions as a protective medium to prevent the liquefied gas from entering into the regulator element in an internal regulator-based fluid storage and dispensing system.

The solid-phase sorbent medium of the present invention is a porous metal matrix comprising at least one, Group VIII or IB metal or metal alloy.

The porous metal matrix may comprise any Group VIII or IB metal or metal alloy that is chemically compatible with the low vapor pressure fluid, accommodating the sorption and desorption of the fluid without adverse reaction or other interaction. The porous metal matrix thus may comprise metals selected from the group consisting of iron, nickel, cobalt, ruthenium, rhodium, palladium, osmium, iridium, platinum, copper, silver, gold and alloys, blends and combinations of one or more of the foregoing metal species.

The term "low vapor pressure", when used herein, means vapor pressure of less than 200 psig, measured at room temperature. Low vapor pressure fluids of particular interest in the general practice of the invention include, but are not limited to, $ClF_3$, $WF_6$, HF, $GeF_4$, $Br_2$, and the like.

Among Group VIII metals, nickel and iron have been discovered to be particularly compatible with low vapor pressure fluids and therefore are highly advantageous materials for forming the porous metal matrix. In a particularly preferred embodiment of the present invention, stainless steel is used as a material of construction for the porous metal matrix.

In one aspect of the invention, the porous metal matrix constitutes a solid-phase metal adsorbent medium for adsorbing low vapor pressure liquids, having (1) an average pore diameter in the range of from about 0.5 nm to about 2.0 nm and (2) a porosity in the range of from about 10% to about 30%. The pore size distribution of such solid-phase metal adsorbent medium is preferably characterized by about 80% to about 90% of pores having a diameter in the range of from about 1.5 nm to about 2.0 nm, and about 10% to about 20% of pores having a diameter greater than 2.0 nm.

The solid-phase metal adsorbent medium of the invention, as described hereinabove, is capable of reducing the pressure of low vapor pressure fluids to subatmospheric pressure levels on the order of 12.6 psia/0.85 atm.

Such solid-phase metal adsorbent medium may also contain non-metal adsorbent particles that are dispersed in a porous Group VIII or Group IB metal matrix, or alternatively, such solid-phase metal adsorbent medium may comprise non-metal adsorbent particles that are coated with Group VIII or IB metal(s) or metal alloy(s). Useful non-metal adsorbent particles in practice of the present invention include, but are not limited to, zeolites, carbon materials, porous silicon. polymers, aluminum phosphosilicate, clays, and combinations of two or more thereof. Among these non-metal adsorbent materials, zeolites and carbon materials, or combinations thereof, are preferred. Preferably, the average pore size of the non-metal adsorbent particles is less than 500 $\mu$m and more preferably in a range of from about 0.5 nm to about 50.0 nm.

In another aspect of the invention, the porous metal matrix constitutes a solid-phase metal sorbent medium for containing and immobilizing liquefied gases in an internal regulator-based fluid storage and dispensing system, having (1) an average pore diameter in a range of from about 0.25 $\mu$m to about 500 $\mu$m and (2) a porosity in a range of from about 15% to about 95%. The solid-phase metal sorbent medium in this embodiment is particularly effective for immobilizing the liquefied gases and preventing such gases from entering into the fluid pressure regulator and iterfering with its proper operation.

Yet another aspect of the present invention relates to a process of forming the porous metal matrix, comprising the steps of:

providing fine metal particles of at least one of Group VIII metals, Group IB metals, and alloys thereof, and sintering such fine metal particles, e.g., in a sintering furnace, to form the porous metal matrix.

The term "fine metal particles" as used herein means metal particles having an average particle size of not more than about 1000 $\mu$m and preferably not more than about 500 $\mu$m. More preferably, the fine metal particles used in the practice of the present invention have an average particle size in the range from about 20 nm to about 1 $\mu$m.

Sintering of the fine metal particles may be carried out in a sintering furnace or in other suitable manner, at an appropriate temperature, e.g., a temperature in a range of from about 20° C. to about 1500° C., to ensure formation of a continuous metal matrix without destroying the porosity of the fine metal particles being sintered.

In a still further aspect of the present invention, the porous metal matrix is formed by a process comprising the steps of:

forming a solid-phase matrix comprising at least one Group VIII or IB metal and an oxidizable carbon-containing material; and heating such solid-phase matrix in the presence of an oxidizing agent to gasify the oxidizable carbon-containing material.

Oxidizable carbon-containing materials useful in the practice of the present invention include, but are not limited to, elemental carbon materials, such as graphite, diamond, amorphous carbon, etc., as well as various hydrocarbon compounds. Preferably, the oxidizable carbon-containing materials comprise hydrocarbon compounds. However, such preference is not intended to limit the broad practice of the present invention. One ordinarily skilled in the art can readily determine, without undue experimentation, other suitable species of carbon-containing materials for the purpose of practicing the present invention, according to specific operational requirements and conditions.

The oxidizing agent useful in the practice of the present invention may include any suitable oxidizer commonly used and well-known in the art. In one preferred embodiment, such oxidizing agent is selected from the group consisting of elemental oxygen, oxygen gas ($O_2$), ozone, air, and combinations thereof. Other kinds of oxidizers can also or alternatively be employed, as will be readily determinable by one ordinarily skilled in the art.

In another specific aspect of the present invention, the porous metal matrix is formed by a process including the following steps:

forming a solid-phase matrix comprising at least one Group VIII or IB metal and soluble metal oxide particles; and immersing such solid-phase matrix in an acidic solution to dissolve said soluble metal oxide particles.

The term "soluble metal oxide", as used herein, means a metal oxide dissolvable in an acidic solution.

Preferably, the soluble metal oxide particles comprise at least one metal component selected from the group consisting of Fe, Ni, Ag, and Pt. The soluble metal oxide particles can be of any suitable particle size and particle size distribution characteristics.

Another aspect of the present invention relates to an adsorption-desorption apparatus, for storage and dispensing of a low vapor pressure fluid, comprising:

a storage and dispensing vessel constructed and arranged for holding a solid-phase metal adsorbent medium;

a solid-phase metal adsorbent medium disposed in said storage and dispensing vessel at an interior gas pressure, said solid-phase metal adsorbent medium comprising a porous metal matrix including at least one Group VIII or IB metal;

a low vapor pressure fluid adsorbed on said solid-phase metal adsorbent medium; and a dispensing assembly coupled in gas flow communication with the storage and dispensing vessel, and arranged for dispensing from the vessel the low vapor pressure fluid desorbed from the solid-phase metal adsorbent medium.

A further aspect of the invention relates to a fluid storage and dispensing system, comprising a vessel holding a solid-phase metal adsorbent medium having a low vapor pressure fluid adsorbed thereon, such vessel including a port having dispensing means associated therewith for controllably dispensing the low vapor pressure fluid desorbed from the solid-phase metal adsorbent medium in a dispensing mode of operation of the system, wherein the solid-phase metal adsorbent medium includes a porous metal matrix comprising at least one Group VIII or IB metal.

Such solid-phase metal adsorbent medium preferably has (1) an average pore diameter in a range of from about 0.5 nm to about 2 nm, and (2) a porosity in a range of from about 10% to about 30%.

Exclusive of the solid-phase metal adsorbent medium of the present invention, such adsorption-desorption apparatus may be of a general type described in U.S. Pat. No. 5,518,528 for "Storage and delivery system for gaseous hydride, halide, and organometallic group V compounds," issued May 21, 1996 to Glenn M. Tom and James V. McManus, the disclosure of which is incorporated by reference herein in its entirety.

Yet another aspect of the present invention relates to a fluid storage and dispensing apparatus, for storage and dispensing of a low vapor pressure liquefied gas, comprising:

a storage and dispensing vessel constructed and arranged for holding a solid-phase metal sorbent medium;

a solid-phase metal sorbent medium disposed in said storage and dispensing vessel at an interior gas pressure, said solid-phase metal sorbent medium comprising a porous metal matrix including at least one Group VIII or IB metal;

a low vapor pressure liquefied gas sorbed by said solid-phase metal sorbent medium;

a fluid dispensing assembly coupled in gas flow communication with the storage and dispensing vessel, and arranged for dispensing from the vessel gas derived from the low vapor pressure liquefied gas; and a fluid pressure regulator associated with the fluid dispensing assembly, and arranged to maintain a predetermined pressure in the interior volume of the vessel, wherein the fluid dispensing assembly is selectively actuatable to flow gas, derived from the low vapor pressure liquefied gas sorbed by said solid-phase metal sorbent medium, through the fluid pressure regulator, for discharge of the gas from the vessel.

Preferably, such metal sorbent medium for sorbing the low vapor pressure liquefied gas is characterazed by (1) an average pore diameter in a range of from about 0.25 $\mu$m to about 500 $\mu$m and (2) a porosity in a range of from about 15% to about 95%.

More preferably, the fluid storage and dispensing apparatus of the present invention further comprises one or more heating elements for supplying thermal energy to compensate for heat loss during the evaporation of the low vapor pressure liquefied gas. Such heating elements may be constructed and arranged in any manner to supply thermal energy to the low vapor pressure liquefied gas. For example, such heating elements may be dispersed among the sorbent medium inside the storage and dispensing vessel; alternatively, such heating elements may be disposed on an external wall of the storage and dispensing vessel and supply thermal energy to the liquefied gas through thermal conduction. The solid-phase metal sorbent medium preferably has high thermal conductivity for effectively conducting the thermal energy from the external wall of the storage and dispensing vessel to the liquefied gas stored therein.

Exclusive of the solid-phase metal sorbent medium of the present invention, such fluid storage and dispensing apparatus may be of a general type described in U.S. Pat. No. 6,089,027 for "Fluid storage and dispensing system," issued Jul. 18, 2000 to Luping Wang and Glenn M. Tom, the disclosure of which is incorporated by reference herein.

Yet another aspect of the present invention relates to a process for supplying a low vapor pressure fluid reagent, comprising:

providing a storage and dispensing vessel containing a solid-phase metal adsorbent medium having a sorptive affinity for said low vapor pressure fluid reagent;

sorptively adsorbing the low vapor pressure fluid reagent on the solid-phase metal adsorbent medium at an interior gas pressure to yield a sorbate fluid-retaining metal adsorbent medium;

desorbing sorbate fluid from the sorbate fluid-retaining metal adsorbent medium; and dispensing the desorbed fluid from said storage and dispensing vessel;

wherein the solid-phase metal adsorbent medium comprises a porous metal matrix including at least one Group VIII or IB metal.

In a still further aspect, the invention relates to a method of supplying a low vapor pressure fluid to a process requiring same, such method comprising sorptively retaining the low vapor pressure fluid on a solid-phase adsorbent including a porous metal matrix comprising at least one Group VIII or IB metal, and desorptively removing the low vapor pressure fluid from the adsorbent and transporting same to the process when the process requires same.

Yet another aspect of the invention relates to a method of suppressing pressure perturbations of a fluid storage and dispensing system including a storage and dispensing vessel for holding a low vapor pressure liquefied gas therein, a discharge assembly disposed on the vessel for dispensing the low vapor pressure liquefied gas therefrom, and a gas flow regulator inside the vessel arranged for flow therethrough of gas deriving from the low vapor pressure liquefied gas, so that gas flows through the regulator prior to flow through the discharge assembly, wherein the pressure perturbations are occasioned by ingress of the low vapor pressure liquefied gas into the regulator, such method comprising shielding the regulator from contact with the low vapor pressure liquefied gas with a body of solid-phase metal sorbent medium arranged in the vessel to sorptively immobilize any low vapor pressure liquefied gas that would otherwise flow into the regulator, such metal sorbent medium including a porous metal matrix comprising at least one Group VIII or IB metal. Preferably, such metal sorbent medium is characterazed by (1) an average pore diameter in a range of from about 0.25 $\mu$m to about 500 $\mu$m and (2) a porosity in a range of from about 15% to about 95%.

Other objects and advantages of the invention will be more fully apparent from the ensuing disclosure and appended claims.

DETAILED DESCRIPTION OF THE INVENTION, AND PREFERRED EMBODIMENT THEREOF

Figure 1:
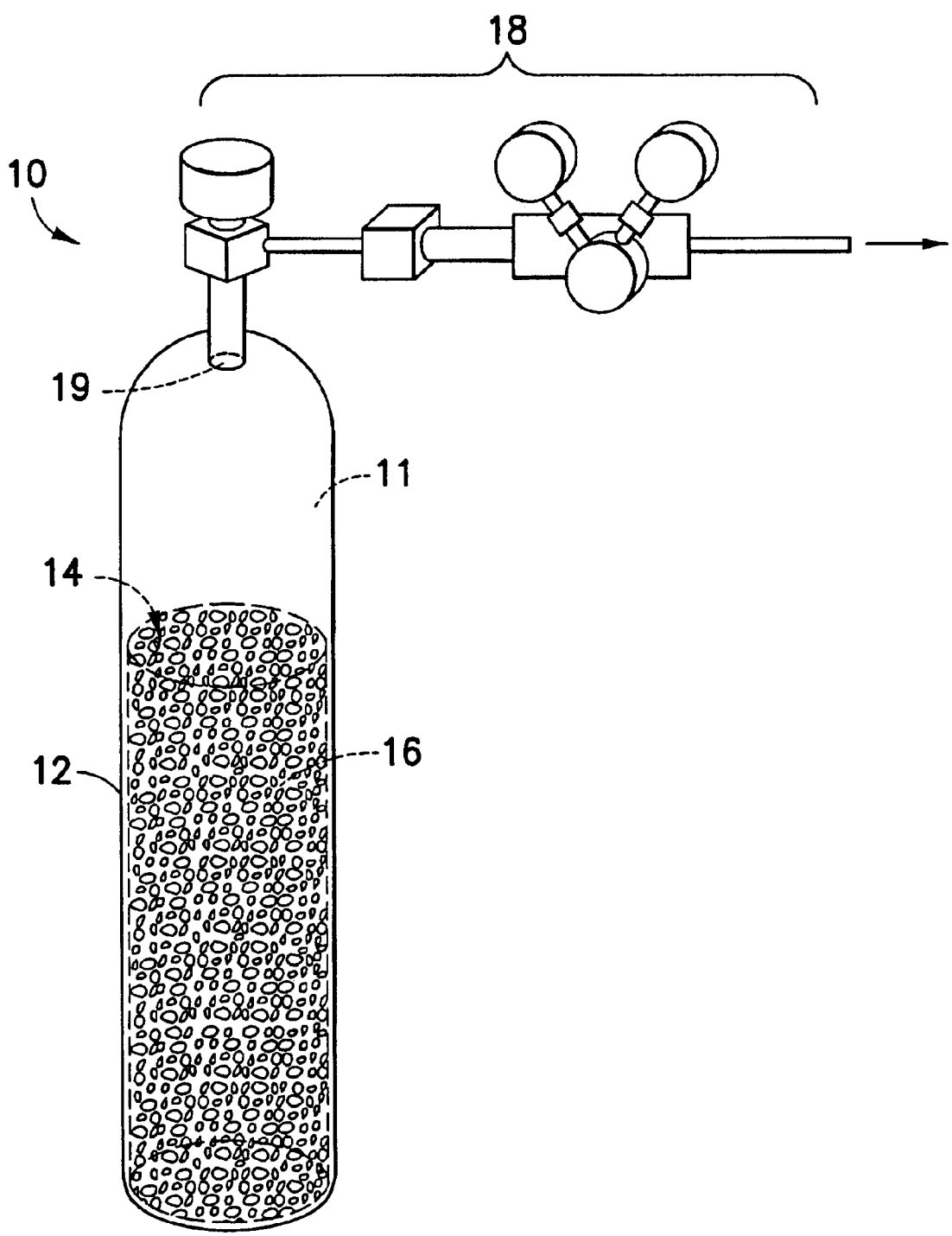
FIG. 1 is a perspective view of an adsorption-desorption apparatus according to one embodiment of the present invention.

The present invention relates to an improved sorbent material for storage and dispensing of low vapor pressure fluids, comprising a porous metal matrix including one or more Group VIII metals. The metal(s) may be in elemental or alloyed forms, and where multiple metal components are present, the metals may be in the form of alloys, blends, and/or other combinations.

Porous metal sorbent materials comprising Group VIII metals have been determined to be chemically compatible with low vapor pressure fluids, such as for example, $ClF_3$, $WF_6$, HF, $GeF_4$, and $Br_2$, etc.

It has been discovered that, unexpectedly, the porous Group VIII and IB metal sorbents of the present invention reversibly interact with the low vapor pressure fluids to sorptively retain the low vapor pressure fluids and to readily desorb the sorbate fluid under dispensing conditions, such as may involve for example pressure differential-mediated desorption, thermally-mediated desorption, concentration differential-mediated desorption, etc.

The porous Group VIII and/or IB metal sorbents of the present invention in one aspect provide a solid-phase metal adsorbent medium for storing and dispensing a low vapor pressure fluid. When used for such purpose, the solid-phase adsorbent medium is preferably characterized by (1) an average pore diameter in a range of from about 0.5 nm to about 2 nm and (2) a porosity in a range of from about 10% to about 30%.

The porous Group VIII and/or IB metal sorbents of the present invention in another aspect provide a protective sorbent medium for immobilizing liquefied gas and preventing ingress of such liquefied gas to the regulator element in an internal regulator-based fluid storage and dispensing system as described in U.S. Pat. No. 6,089,027 for "Fluid storage and dispensing system," issued Jul. 18, 2000 to Luping Wang and Glenn M. Tom, the disclosure of which is incorporated by reference herein. When used for such purpose, the solid-phase sorbent medium is preferably characterized by (1) an average pore diameter in a range of from about 0.25 $\mu$m to about 500 $\mu$m and (2) a porosity in a range of from about 15% to about 95%.

The solid phase sorbent medium of the invention is a porous metal matrix comprising at least one Group VIII metal, Group IB metal or metal alloy, e.g., iron, nickel, cobalt, ruthenium, rhodium, palladium, osmium, iridium, platinum, copper, silver, gold and alloys, blends and combinations of one or more of the foregoing metal species. The porous metal matrix is selected to be chemically compatible with the low vapor pressure fluid, such as for example $ClF_3$, $WF_6$, HF, $GeF_4$, $Br_2$, or the like, and to accommodate the adsorption and desolption of the fluid without adverse reaction or other interaction. Nickel, iron and stainless steel are highly preferred porous metal matrix materials of construction.

The solid-phase adsorbent may be in any suitable shape or conformation, including spherical particles, cylindrical particles, powders, granules, flakes, sheets, or other geometrically regular or irregular forms. The particulate or divided form adsorbent may be contained in the fluid storage and dispensing vessel in a bed or fixed mass, as appropriate to the fluid and its end use application.

The solid-phase metal adsorbent comprising the porous Group VIII and/or IB metal matrix may also contain non-metal adsorbent particles dispersed in the solid-phase adsorbent composition. Alternatively, the solid-phase metal adsorbent may be constituted with non-metal adsorbent particles that are coated with Group VIII and/or IB metal(s) or metal alloy(s). The non-metal adsorbent particles for such purpose can be formed of zeolites, carbon materials, porous silicon, polymers, aluminum phosphosilicate, clays, or combinations of two or more of such species, with zeolites and/or carbon materials being preferred. The average size of the non-metal adsorbent particles is preferably in the range of from about 1000 $\mu$m to about 10 $\mu$nm.

The porous metal matrix may be formed from fine metal particles, e.g., having an average particle size in the range from about 1000 $\mu$m to about 20 nm of Group VIII or IB metals that are sintered, e.g., in a sintering furnace at a temperature in a range of from about 20° C. to about 1500° C., to form the porous metal matrix. The sintering operation should be closely controlled, e.g., by thermal monitoring elements and temperature controllers, to provide a sintered product retaining good porosity characteristics. Excessive temperatures in the sintering operation will result in occlusion and closure of the porosity in the matrix structure, and appropriate sintering temperatures and exposure times may be readily empirically determined for a given application of the invention.

In an alternative synthesis technique, porous metal matrix sorbent materials in accordance with the invention can be manufactured by forming a solid-phase matrix of the Group VIII or IB metal or metal alloy, and an oxidizable carbon-containing material. This solid-phase matrix then is heated in the presence of an oxidizing agent to gasify the oxidizable carbon-containing material. The oxidizable carbon-containing material may be of any suitable type, such as elemental carbon materials (graphite, diamond, amorphous carbon, etc.) or any of various hydrocarbon compounds. The oxidizing agent can contain elemental oxygen, oxygen gas ($O_2$), ozone, air, or combinations of such materials.

In another variant synthesis technique, the porous metal matrix is manufactured by forming a solid-phase matrix including the Group VIII metal and soluble metal oxide particles, and then immersing the solid-phase matrix in an acidic solution capable of dissolving the metal oxide particles. Preferably, the soluble metal oxide particles are formed of a metal such as Fe, Ni, Ag, or Pt, of suitable particle size and particle size distribution characteristics, e.g., having an average particle size in a range of from about 0.5 nm to about 2.0 nm.

The porous metal matrix adsorbents of the invention can be usefully employed in an adsorption-desorption apparatus for storage and dispensing of a low vapor pressure fluid, including a storage and dispensing vessel holding the adsorbent at an interior gas pressure, and the vessel coupled to a dispensing assembly arranged to dispense desorbed low vapor pressure fluid from the vessel in dispensing operation.

Adsorption-desorption apparatus of a general type in which the porous metal matrix adsorbents of the invention can be usefully employed, are described in U.S. Pat. No. 5,518,528 for "Storage and delivery system for gaseous hydride, halide, and organometallic group V compounds," issued May 21, 1996 to Glenn M. Tom and James V. McManus.

The porous metal matrix of the invention can also be utilized in a regulator-based storage and dispensing systems of a type described in U.S. Pat. No. No. 6,089,027 for "Fluid storage and dispensing system," issued Jul. 18, 2000 to Luping Wang and Glenn M. Tom, for protection of the regulator element. In such application, the porous metal matrix adsorbent can be deployed in a fluid inlet passage coupled to the fluid regulator, e.g., in a flow-through compartment of such passage containing a solid-phase metal sorbent medium formed of the porous metal matrix, whereby the metal sorbent medium sorptively immobilizes any low vapor pressure liquefied gas and prevents such from entering the fluid inlet passage from the bulk liquid volume in the vessel, to thereby protect the regulator from pressure perturbations.

Fluid storage and dispensing systems of the above-described types may be usefully employed for supplying low vapor pressure fluid reagent, by loading the porous metal adsorbent in the storage and dispensing vessel with the low vapor pressure fluid reagent. The porous metal adsorbent, having a sorptive affinity for the low vapor pressure fluid, physically adsorbs the fluid.

At the conclusion of the sorption, when the porous metal adsorbent has been loaded with the fluid and all thermal (heat of sorption) effects have dissipated, an interior gas pressure obtains in the interior volume of the vessel. The porous metal adsorbent of the invention enables sub-atmospheric pressure to be maintained in the vessel, to maximize the safety of the contained fluid system. In subsequent use, fluid is desorbed from the metal adsorbent and dispensed from the vessel.

Desorption may be effected in any suitable manner, e.g., by heating of the porous metal adsorbent to effect desorption of the fluid species from the adsorbent, or by establishing a pressure differential that causes the fluid to desorb from the adsorbent, e.g., application of vacuum or suction to the interior volume of the vessel through the associated dispensing assembly of the vessel to desorptively extract the sorbed fluid from the adsorbent, or by flowing a carrier gas through the vessel in order to create a concentration differential, and effect desorption of the fluid from the adsorbent by the associated mass transfer gradient, so that the fluid is released from the adsorbent and entrained in the carrier gas stream, for discharge from the vessel.

Alternatively, two or more of the above-described modes may be applied to effect desorption of the fluid from the porous metal adsorbent. Further, any other method of desorption may be employed, as efficacious to produce disengagement of the adsorbed fluid species from the metal adsorbent.

Referring now to the drawings, FIG. 1 is a schematic representation of a storage and dispensing system 10 comprising storage and dispensing vessel 12. The storage and dispensing vessel may for example comprise a conventional gas cylinder container of elongate character, or other vessel of desired size and shape characteristics. In the interior volume of such vessel is disposed a bed 14 of the porous metal adsorbent 16 of the present invention.

The vessel 12 is provided at its upper end with a conventional cylinder head fluid dispensing assembly 18 coupled with the main body of the cylinder 12 at the port 19. Port 19 allows fluid flow from the interior volume 11 of the cylinder into the dispensing assembly 18. To prevent entrainment of particulate solids in the fluid being dispensed from the cylinder, the port 19 may be provided with a frit or other filter means therein.

The vessel 12 may also be provided with internal or external heating elements (not shown) that serve to thermally assist desorption of the sorbate fluid. Preferably, however, the sorbate fluid is at least partially, and most preferably fully, dispensed from the storage and dispensing vessel containing the adsorbed fluid by pressure differential-mediated desorption. Such pressure differential may be established by flow communication between the storage and dispensing vessel, on the one hand, and the exterior dispensing environment or locus of use, on the other. The dispensing means for the vessel may include pumps, blowers, fans, eductors, ejectors, etc., or any other motive driver for flowing the fluid from the vessel to the locus of use of the dispensed fluid.

The adsorbent 16 comprises a porous metal matrix including at least one Group VIII or IB metal or metal alloy, having sorptive affinity for the low vapor pressure fluid to be stored and subsequently dispensed from the vessel 12, with the sorbate fluid being suitably desorbable from the adsorbent. Such adsorbent 16 is preferably characterized by (1) an average pore diameter in a range of from about 0.5 nm to about 2.0 nm and (2) a porosity in a range of from about 10% to about 30%. The pore size distribution of such adsorbent 16 is preferably characterized by about 80% to about 90% of pores having a diameter in a range of from about 1.5 nm to about 2.0 nm, and about 10% to about 20% of pores having a diameter greater than 2 nm.

The adsorbent may be suitably processed or treated to ensure that it is devoid of trace components that may deleteriously affect the performance of the fluid storage and dispensing system.

The adsorbent may be provided in the form of particles, granules, extrudates, powders, cloth, web materials, honeycomb or other monolithic forms, composites, or other suitable conformations.

Although it generally is preferred to operate solely by pressure differential at ambient temperature conditions, in respect of the sorption and desorption of the gas to be subsequently dispensed, the storage and dispensing system may in some instances advantageously employ a heater operatively arranged in relation to the storage and dispensing vessel for selective heating of the adsorbent, to effect thermally-enhanced desorption of the sorbed fluid from the solid-phase adsorbent.

The fluid storage and dispensing system optionally may be constructed with the adsorbent being present in the storage and dispensing vessel together with a chemisorbent material having a chemisorptive affinity for contaminants of the sorbate fluid therein.

The fluid storage and dispensing system of the type shown in FIG. 1 is advantageously employed for the delivery of low vapor pressure fluids in a wide variety of applications, e.g., to carry out various unit operations of semiconductor manufacturing processes.

Figure 2:
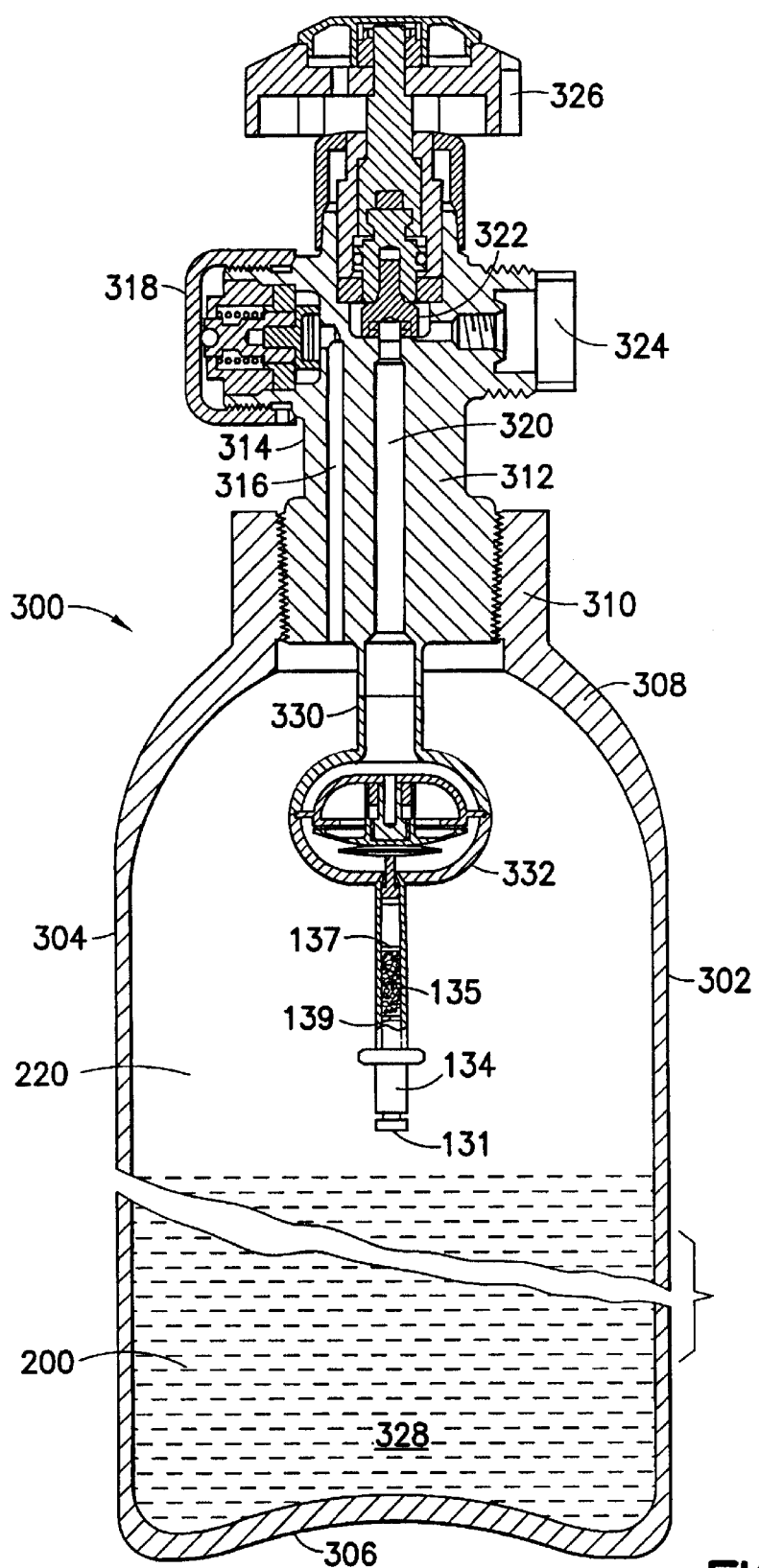
FIG. 2 is a schematic cross-sectional elevation view of a fluid storage and dispensing system according to another embodiment of the present invention.

FIG. 2 is a schematic cross-sectional elevation view of a fluid storage and dispensing system 300 comprising a sorbent medium 135 formed of a porous metal matrix, according to one embodiment of the present invention. The system 300 includes a fluid storage and dispensing vessel 302 of generally cylindrical form, with cylindrical side wall 304 closed at its lower end by floor member 306. At the upper end of the vessel is a neck 308 including a cylindrical collar 310 definingg and circumscribing a top opening of the vessel. The vessel wall, floor member and neck thereby enclose an interior volume 328 as shown.

The interior volume contains a low vapor pressure liquefied gas 200, with the portion of the interior volume 328 that is above the liquid 200 containing the corresponding gas 220 derived from the liquid 200.

At the neck of the vessel, a threaded plug 312 of the valve head assembly 314 is threadably engaged with the interior threaded opening of the collar 310. The valve head assembly 314 includes a central fluid flow passage 320 joined in fluid flow communication with a central working volume cavity in the valve head assembly. The central working volume cavity is in turn joined to outlet 324, which may be exteriorly threaded or otherwise constructed for attachment of a connector and associated piping, conduit, etc. thereto.

Disposed in the central working volume cavity is a valve element 322 that is joined to a hand wheel 326 in the embodiment shown, but may alternatively be joined to an automatic valve actuator or other controller or actuating means.

The valve head assembly 314 also features in the valve block a vent flow passage 316 joined to an over-pressure relief valve 318 and communicating with the interior volume 328 of the vessel, for relief of gross over-pressure conditions in the vessel.

The central fluid flow passage 320 in the valve head assembly 314 is joined at its lower end to a connector flow tube 330, to which in turn is joined to the regulator 332. The regulator is set to maintain a selected pressure of the fluid discharged from the vessel, i.e., the gas deriving from the liquid 200. At the lower end of the regulator is joined a gas inlet tube 336 which in turn is joined, e.g., by butt welding, to a diffuser unit 134 having a diffuser end cap 131 at its lower extremity. The diffuser unit may be formed of stainless steel, with the diffuser wall being formed of a sintered stainless steel such as 316L stainless steel. The diffuser unit has a wall porosity that permits removal of all particles greater than a predetermined diameter, e.g., greater than 0.003 micrometers at 30 standard liters per minute flow rate of gas from the system. Filter diffuser units of such type are commercially available from Millipore Corporation (Bedford, Mass.) under the trademark WAFERGARD.

In the intermediate portion of the bore of the gas inlet tube 336 is disposed a bed of the porous metal sorbent 135 of the present invention disposed between two foraminous retention elements 137 and 139, which may for example comprise disk-shaped screen or mesh elements that are secured to the inner wall surface of the gas inlet tube 336 and retain the metal sorbent 135 in position. The porous metal matrix sorbent of the present invention is selected to have a suitably high sorptive affinity for the low vapor pressure liquid 200 in contact therewith under conditions obtaining in the interior volume of the vessel 302. By such provision, the sorbent is presented to sorptively immobilize any liquid 200 that could otherwise, in the absence of the adsorbent, flow into the regulator 332 and interfere with its proper operation.

In use, the low vapor pressure liquid 200 is contained in the interior volume 328 of the vessel 302. The fluid pressure regulator 332 is set to a selected set point to provide flow of dispensed gas when the valve in the valve head assembly 314 is opened, with the gas flowing through the diffuser unit 334, gas inlet tube 336 (and adsorbent bed 135 therein), regulator 332, connector flow tube 330, central fluid flow passage 320 in the valve head assembly 314, the central working volume cavity, and outlet 324. The valve head assembly may be joined to other piping, conduits, flow controllers, monitoring means, etc. as may be desirable or required in a given end use application.

The system shown in FIG. 2 thus utilizes the porous metal matrix sorbent of the invention in a guard bed, to thereby prevent liquid access to the internally disposed regulator in the storage and dispensing vessel. Accordingly, the sorbent in such deployment serves to prophylactically sorb any influent liquid in the gas inlet tube 336 to avoid the occurrence of pressure perturbations in the operation of the regulator 332, so that the storage and dispensing system is enabled to supply gas at a desired consistent pressure and flow rate.

The system of FIG. 2 may also comprise one or more internal or external heating elements (not shown) to supply thermal energy to the liquid 200. When liquid 200 evaporates to form the gas 220 for delivery out of the vessel, thermal energy in the liquid 200 reduces significantly as a result of such evaporation, which in turn causes cooling of the liquid 200. Such cooling will lower the evaporation speed and slow down the gas flow from the liquid 200. In order to compensate for such reduction of thermal energy due to evaporation, internal or external heating elements can be employed to continuously or periodically supply thermal energy to the liquid 200. Such heating elements can be dispersed directly within the liquid 200, or alternatively, be disposed on the external wall of the vessel 302.

The invention will be more fully understood with reference to the following non-limiting examples:

EXAMPLE 1

Tests were conducted to determine the sorbate storage capacities of two porous metal adsorbent materials. The first adsorbent is formed bysintering INCO® Type 210 nickel powder (commercially available from Inco Limited, Wyckoff, N.J., USA) and the second adsorbent was formed from INCOFOAM® porous nickel substrate (commercially available from Inco Limited, Wyckoff, N.J. USA). Eachadsorbent was placed in a 7 m available from Swagelok Company, Solon, Ohio, USA), which was then positioned in a in stainless steel container having an interior volume of 50 ml.

Isopropanol (hereinafter "IPA") was added to the sorbent. The total weight of IPA liquid added was recorded, and the container was continuously monitored for detection of any IPA liquid dripping. As soon as dripping of liquid from the container was detected, addition of IPA liquid was immediately terminated, and the total weight of IPA liquid previously added was recorded. The total weight of the added IPA liquid indicated the IPA capacity of the tested adsorbent.

The test results for the two sorbents respectively formed of Inco Type 210 nickel powder and of Incofoam were as follows:

|  | Inco Type 210 | Incofoam |
| --- | --- | --- |
| IPA capacity | 26.3 g/50 ml | 20 g/50 ml |

EXAMPLE 2

Similar tests for adsorbents formed of INCO® Type 210 nickel powder (commercially available from Inco Limited, Wyckoff, N.J., USA) and of INCOFOAM® porous nickel substrate (commercially available from Inco Limited, Wyckoff, N.J., USA) were conducted to determine the storage capacities of such adsorbents for $Br_2$ gas.

|  | INCO ® Type 210 nickel powder | INCOFOAM ® porous nickel substrate |
| --- | --- | --- |
| $Br_2$ holding capacity | 27 g/50 ml | — |

Although the invention has been variously disclosed herein with reference to illustrative embodiments and features, it will be appreciated that the embodiments and features described hereinabove are not intended to limit the invention, and that other variations, modifications, and other embodiments will suggest themselves to those of ordinary skill in the art. The invention therefore is to be broadly construed, consistent with the claims hereafter set forth.

What is claimed is:

1. A fluid storage and dispensing system for storage and dispensing of a low vapor pressure fluid, comprising:
   a storage and dispensing vessel;
   a solid-phase metal sorbent comprising a porus metal matrix disposed in said storage and dispensing vessel at an interior gas pressure, wherein said porous metal matrix comprises at least one Group VIII metal, Group IB metal, or metal alloy thereof;
   a low vapor pressure fluid sorbed on the sorbent; and
   a dispensing assembly coupled in gas flow communication with the storage and dispensing vessel, and arranged for dispensing fluid from said vessel.

2. The fluid storage and dispensing system of claim 1, wherein the low vapor pressure fluid to be stored and dispensed by said system comprises a fluid species selected from the group consisting of chlorine trifluoride ($ClF_3$), tungsten hexafluoride ($WF_6$), hydrogen fluoride (HF), germanium tetrafluoride ($GeF_4$), and bromine ($Br_2$).

3. The fluid storage and dispensing system of claim 1, wherein the porous metal matrix comprises one or more metals selected from the group consisting of iron, nickel, cobalt, ruthenium, rhodium, palladium, osmium, iridium, platinum, copper, silver, gold, and alloys thereof.

4. The fluid storage and dispensing system of claim 1, wherein the porous metal matrix comprises nickel.

5. The fluid storage and dispensing system of claim 1, wherein the porous metal matrix comprises stainless steel.

6. The fluid storage and dispensing system of claim 1, wherein the porous metal matrix forms a solid-phase metal adsorbent material and is characterized by an average pore diameter in a range of from about 5 nm to 20 nm.

7. The fluid storage and dispensing system of claim 6, wherein the porous met matrix is further characterized by a porosity in a range of from about 10 to abut 30% based on total volume the porous metal matrix.

8. The fluid storage and dispensing system of claim 6, wherein the porous metal matrix is further characterized by a pore size distribution, wherein (1) from about 80% to about 90% of pores have a diameter in a range of from about 1.5 nm to about 2.0 nm, and (2) from about 1.0% to about 20% of pores have a diameter greater than 2.0 nm.

9. The fluid storage and dispensing system of claim 6, wherein the porous metal matrix is comprises non-metal adsorbent particles dispersed therein.

10. The fluid storage and dispensing system of claim 9, wherein the non-metal adsorbent particles comprise a material selected from the group consisting of zeolites, carbon materials, porous silicon, polimers, aluminum phosphosilicate, clays, and combinations of two or more species thereof.

11. The fluid storage and dispensing system of claim 9, wherein the non-metal adsorbent particles comprises a material selected from the group consisting of zeolites, carbon materials, and combinations thereof.

12. The fluid storage and dispensing system of claim 9, wherein the non-metal adsorbent particles have average pore size in a range of from about 0.5 nm to about 50.0 nm.

13. The fluid storage and dispensing system of claim 6, wherein the porous metal matrix further comprises non-metal adsorbent particles coated with a Group VIII metal, a Group IB metal or a metal alloy thereof.

14. The fluid storage and dispensing system of claim 13, wherein the non-metal adsorbent particles comprise a material selected from the group consisting of zeolites, carbon materials, porous silicon, polymers, aluminum phosphosilicate, clays, and combinations of two or more species thereof.

15. The fluid storage and dispensing system of claim 13, wherein the non-metal adsorbent particles are formed of a material selected from the group consisting of zeolites, carbon materials, and combinations thereof.

16. The fluid storage and dispensing system of claim 13, wherein the non-metal adsorbent particles have average pore size in a range of frond about 0.5 nm to about 50.0 nm.

17. The fluid storage and dispensing system of claim 1, wherein the porous metal matrix forms a solid-phase metal sorbent medium and is characterized by an average pore diameter in a range of from about 0.25 $\mu$m to about 500 $\mu$m.

18. The fluid storage and dispensing system of claim 17, wherein the porous metal matrix is further characterized by a porosity in a range of from about 15% to about 95%, based on total volume of the porous metal matrix.

19. An adsorption-desorption apparatus, for storage and dispensing of a low vapor pressure fluid, said apparatus comprising:
a storage and dispensing vessel constructed and arranged for holding a solid-phase metal adsorbent medium;
a solid-phase metal adsorbent medium disposed in said storage and dispensing vessel at an interior gas pressure, wherein said solid-phase adsorbent medium includes a porous metal matrix comprising at least one Group VIII or Group IB metal;
a low vapor pressure fluid adsorbed on said solid-phase adsorbent medium; and
a dispensing assembly coupled in gas flow communication with the storage and dispensing vessel, and arranged for dispensing from the vessel low vapor pressure fluid desorbed from the solid-phase metal adsorbent medium.

20. The adsorption-desorption apparatus of claim 19, wherein the low vapor pressure fluid comprises a fluid species selected from the group consisting of chlorine trifluoride ($ClF_3$), tungsten hexafluoride ($WF_6$), hydrogen fluoride (HF), germanium tetrafluoride ($GeF_4$), and bromine ($Br_2$).

21. The adsorption-desorption apparatus of claim 19, wherein the porous metal matrix comprises one or more metals selected from the group consisting of iron, nickel, cobalt, ruthenium, rhodium, palladium, osmium, iridium, platinum, copper, silver, gold, and alloys thereof.

22. The adsorption-desorption apparatus of claim 19, wherein the porous metal matrix comprises nickel.

23. The adsorption-desorption apparatus of claim 19, wherein the porous metal matrix comprises stainless steel.

24. The adsorption-desorption apparatus of claim 19, wherein the porous metal matrix is characterized by an average pore diameter in a range of from about 0.5 nm to about 20 nm.

25. The adsorption-desorption apparatus of claim 24, wherein the porous metal matrix is characterized by Porosity in a range of from about 10% to about 30% by total volume of such porous metal matrix.

26. The adsorption-desorption apparatus of claim 19, further comprising non-metal adsorbent particles dispersed in the solid-phase adsorbent medium.

27. The adsorption-desorption apparatus of claim 26, wherein the non-metal adsorbent particles comprise a material selected from the group consisting of zeolites, carbon materials, porous silicon, polymers, aluminum phosphosilicate, clays, and combinations of two or more species thereof.

28. The adsorption-desorption apparatus of claim 26, wherein the non-metal adsorbent particles comprise a material selected from the group consisting of zeolites, carbon materials, and combinations thereof.

29. The adsorption-desorption apparatus of claim 26, wherein the non-metal adsorbent particles have average pore size in a range of from about 0.5 nm to about 50.0 nm.

30. The adsorption-desorption apparatus of claim 19, further comprising non-metal adsorbent particles coated with a Group VIII metal, a Group IB metal or metal alloy tereof.

31. The adsorption-desorption apparatus of claim 30, wherein the non-metal adsorbent particles comprise a material selected from the group consisting of zeolites, carbon materials, porous siicon, polymers, aluminum phoposilicate, clays, and combinations of two or more species thereof.

32. The adsorption-desorption apparatus of claim 30, wherein the non-metal adsorbent particles comprise a material selected from the group consisting of zeolites, carbon materials, and combinations thereof.

33. The adsorption-desorption apparatus of claim 30, wherein the non-metal adsorbent particles have average particle size in a range of from about 0.5 nm to about 50.0 nm.

34. A fluid storage and dispensing system, comprising a vessel holding a solid-phase metal adsorbent medium having a low vapor pressure fluid adsorbed thereon, said vessel including a port having dispensing means associated therewith for controllably dispensing said low vapor pressure fluid desorbed from the solid-phase metal adsorbent medium in a dispensing mode of operation of said system, wherein said solid-phase metal adsorbent medium comprises a porous metal matrix containing at least one Group VIII or Group IB metal.

35. The fluid storage and dispensing system of claims 34, wherein the porous metal matrix is characterized by an average pore diameter in a range of from about 0.5 nm to about 2.0 nm.

36. The fluid storage and dispensing system of claim 35, wherein the porous metal matrix is further characterized by porosity in a range of from about 10% to about 30%, based on total volume of said porous metal matrix.

37. A fluid storage and dispensing apparatus for storage and dispensing of a low vapor pressure liquefied gas, comprising:
a storage and dispensing vessel constructed and arranged for holding a solid-phase metal sorbent medium;
a solid-phases metal sorbent medium disposed in said storage and dispensing vessel at an interior gas pressure, said solid-phase metal sorbent medium comprising a porous metal matrix including at least one Group VIII or Group IB metal;
a low vapor pressure liquefied gas sorbed by said solid-phase metal sorbent medium;
a fluid dispensing assembly coupled in gas flow communication with the storage and dispensing vessel, and arranged for dispensing from the vessel gas derived from the low vapor pressure liquefied gas; and
a double-stage fluid pressure regulator associated with the fluid dispensing assembly, and arranged to maintain a predetermined pressure in the interior volume of the vessel,
wherein the fluid dispensing assembly is selectively actuatable to flow gas, derived from the low vapor pressure liquefied gas sorbed by said solid-phase metal sorbent medium, through the double-stage fluid pressure regulator, for discharge of the gas from the vessel.

38. A fluid storage and dispensing apparatus of claim 37, wherein the porous metal matrix is characterized by an average pore diameter in a range of from about 0.25 $\mu$m to about 500 $\mu$m.

39. A fluid storage and dispensing apparatus of claim 38, wherein the porous metal matrix is further characterized by a porosity in a range of from about 15% to about 95%, based total volume of the porous metal matrix.

40. A fluid storage and dispensing apparatus of claim 37, further comprising one or more heating elements for supplying thermal energy to the low vapor pressure liquefied gas to compensate for heat loss during evaporation of such low vapor pressure liquefied gas.

41. A fluid storage and dispensing apparatus of claim 40, wherein said heating elements are disposed on an external wall of the storage and dispensing vessel, and wherein the solid-phase metal sorbent medium conducts thermal energy supplied by said heating elements to the sorbed low vapor pressure liquefied gas.

42. A fluid storage arid dispensing system, comprising a storage and dispensing vessel for holding a low vapor pressure liquefied gas therein, a discharged assembly disposed on the vessel for dispensing low vapor pressure liquefied gas therefrom, and a gas flow regulator inside the vessel arranged for flow therethrough of gas deriving from the low vapor pressure liquefied gas, so that gas flows through the regulator prior to flow through the discharge assembly, with a body of solid-phase metal sorbent arranged in the vessel to sorptively immobilize any low vapor pressure liquefied gas that would otherwise flow into the regulator, said solid-phase metal sorbent including a porous metal matrix comprising at least one Group VIII or Group IB metal, wherein the porous metal matrix of said solid-phase metal sorbent has an average pore diameter in a range of from about 0.25 $\mu$m to about 500 $\mu$m.

43. The fluid storage and dispensing system of claim 42, wherein the regulator is coupled with a gas flow conduit inside the vessel arranged to receive gas deriving from the low vapor pressure liquefied gas, for flow of said gas through the conduit, the regulator and the discharge assembly, wherein said body of solid-phase metal sorbent is provided in said gas flow conduit, for contacting and sorbing liquid therein.

44. A fluid storage and dispensing system for storing and dispensing a low vapor pressure fluid, comprising:

a storage and dispensing vessel;

a solid-phase metal sorbent, wherein the sorbent includes a porous metal matrix disposed in said storage and dispensing vessel at an interior gas pressure, wherein said porous metal matrix comprises a porous Group IB or VIII metal or metal alloy matrix having an average pore diameter in a range (i) of from about 0.5 nm to about 2.0 nm, or (ii) of from about 0.25 $\mu$m to about 500 $\mu$m; and a dispensing assembly coupled in gas flow communication with the storage and dispensing vessel, and arranged for dispensing fluid from said vessel.

* * * * *